United States Patent
Wiklof et al.

(10) Patent No.: US 10,614,858 B2
(45) Date of Patent: Apr. 7, 2020

(54) METHOD AND APPARATUS FOR EDITING MEDIA CONTENT

(71) Applicant: HOWL HOLDINGS LLC, Seattle, WA (US)

(72) Inventors: Christopher A. Wiklof, Everett, WA (US); Geoffrey D. Osler, Seattle, WA (US); Timothy M. Londergan, Seattle, WA (US)

(73) Assignee: HOWL HOLDINGS LLC, Seattle, WA (US)

( * ) Notice: Subject to any disclaimer, the term of this patent is extended or adjusted under 35 U.S.C. 154(b) by 0 days.

(21) Appl. No.: 16/554,989

(22) Filed: Aug. 29, 2019

(65) Prior Publication Data

US 2020/0066306 A1    Feb. 27, 2020

Related U.S. Application Data

(63) Continuation-in-part of application No. PCT/US2018/053807, filed on Oct. 1, 2018.

(60) Provisional application No. 62/572,157, filed on Oct. 13, 2017, provisional application No. 62/567,054, filed on Oct. 2, 2017.

(51) Int. Cl.
| | | |
|---|---|---|
| *G11B 27/30* | (2006.01) | |
| *H04N 5/765* | (2006.01) | |
| *H04L 29/06* | (2006.01) | |

(52) U.S. Cl.
CPC ........... *G11B 27/309* (2013.01); *H04N 5/765* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 8,942,533 B2 | 1/2015 | Wiklof | |
| 2011/0289413 A1 | 11/2011 | Ubillos et al. | |
| 2012/0137255 A1 | 5/2012 | Folchi et al. | |
| 2016/0110877 A1 | 4/2016 | Schwartz et al. | |
| 2016/0261915 A1 | 9/2016 | Niebres et al. | |
| 2016/0316176 A1* | 10/2016 | Laska | H04W 12/003 |

FOREIGN PATENT DOCUMENTS

| | | |
|---|---|---|
| JP | 2016-208516 | 12/2016 |
| KR | 10-1427718 | 8/2014 |
| KR | 1020150022601 | 3/2015 |

(Continued)

OTHER PUBLICATIONS

PCT International Search Report and Written Opinion dated Jan. 30, 2019, for PCT International Patent Application No. PCT/US2018/053805 filed Oct. 1, 2018, 13 pages.

(Continued)

*Primary Examiner* — Christopher Braniff
(74) *Attorney, Agent, or Firm* — Christopher A. Wiklof; Launchpad IP, Inc.

(57) ABSTRACT

A system presents a media playback. The system receives a plurality of time stamped trigger data. The system reads a plurality of media segments from a media capture device. Each media segment corresponds to a respective time stamped trigger datum. The system outputs the plurality of media segments as a playback including the plurality of media segments.

19 Claims, 12 Drawing Sheets

SEGMENT 1
DURATION: 00m 37s
TIME: 3:55 p.m.

SEGMENT 2
DURATION: 00m 15s
TIME: 4:01 p.m.

SEGMENT 3
DURATION: 01m 03s
TIME: 6:15 p.m.

(56) References Cited

FOREIGN PATENT DOCUMENTS

| | | |
|---|---|---|
| KR | 1020150112113 | 10/2015 |
| KR | 10-1656241 | 9/2016 |

OTHER PUBLICATIONS

PCT International Search Report and Written Opinion dated Feb. 12, 2019, for PCT International Patent Application No. PCT/US2018/053807 filed Oct. 1, 2018, 21 pages.

* cited by examiner

310

FULL VIDEO
DURATION: 03H 13M 07S

312

HIGHLIGHT COMPILATION
DURATION: 04M 27S
SEGMENTS: 12

SEGMENT 1
DURATION: 00m 37s
TIME: 3:55 p.m.

SEGMENT 2
DURATION: 00m 15s
TIME: 4:01 p.m.

SEGMENT 3
DURATION: 01m 03s
TIME: 6:15 p.m.

METHOD AND APPARATUS FOR EDITING MEDIA CONTENT

CROSS REFERENCE TO RELATED APPLICATIONS

The present application is a Continuation-in-Part Application which claims priority benefit under 35 U.S.C. § 120 (pre-AIA) of co-pending International Patent Application No. PCT/US2018/053807, entitled "METHOD AND APPARATUS FOR EDITING MEDIA CONTENT," filed Oct. 1, 2018. International Patent Application No. PCT/US2018/053807 claims priority benefit from U.S. Provisional Patent Application No. 62/572,157, entitled "METHOD AND APPARATUS FOR EDITING MEDIA CONTENT," filed Oct. 13, 2017. International Patent Application No. PCT/US2018/053807 also claims priority benefit from U.S. Provisional Patent Application No. 62/567,054, entitled "RETROSPECTIVE CAPTURE TRIGGER," filed Oct. 2, 2017. Each of these applications, to the extent not inconsistent with the disclosure herein, is incorporated by reference.

SUMMARY

According to an embodiment, a computer method for presenting a media playback includes receiving a plurality of time stamped trigger data from a plurality of user devices into a server computer, reading, with the server computer, a plurality of media segments from a plurality of different media capture devices via a network connection between the server computer and the media capture devices, each media segment corresponding to a respective time stamped trigger datum, and outputting the plurality of media segments as a playback including the plurality of media segments on an electronic display operatively coupled to the server computer. Reading the plurality of media segments from the plurality of different media capture devices may include reading a time datum corresponding media segment from each of a plurality of cross-registered devices without reference to whether a particular one of the cross-registered devices received a trigger. Cross-registration may include enrollment in a group defined on a communication network.

According to an embodiment, a media processing system includes a plurality of media capture devices at least intermittently operatively coupled to a communication network, a plurality of trigger devices at least intermittently operatively coupled to the communication network, and a server computer operatively coupled to the communication network, the server computer being configured to run one or more software programs. The one or more software programs may include a data reading module configured to read captured media and trigger data respectively from the plurality of media capture devices and the plurality of trigger devices, the trigger data including a plurality of time stamps, each indicating a real time associated with a trigger event, and a media processing module configured to generate, from the captured media and the trigger data, a plurality of media segments, each media segment corresponding to a trigger datum from at least one of the plurality of media capture devices. The media processing system includes, in the software program run by the server computer or in a local software program run on one or more of the media capture devices, an interface module configured to present a media playback including the media segments to a user. The media playback may include, for each trigger datum, plural media segments each received from a respective one of the plurality of media capture devices.

According to an embodiment, a method for presenting a media playback includes receiving a plurality of time stamped trigger data, and reading at least a thumbnail from each of a plurality of media segments from a media capture device. Each media segment corresponds to a respective time stamped trigger datum. The method includes outputting a plurality of thumbnails arranged along a timeline at a location corresponding to a moment of each trigger datum. The method includes receiving a selection of a portion of the thumbnails via a user interface (UI). The method includes outputting a portion of the plurality of media segments, the portion corresponding to the selected thumbnails, as a media playback.

According to an embodiment, a non-transitory computer-readable medium has a plurality of computer-executable instructions which, when executed by a processor, provide a media processing system. The media processing system includes a data reading module configured to read captured media and trigger data, the trigger data including a plurality of time stamps each indicating a real time associated with a trigger event. The media processing system also includes a media processing module configured to generate a plurality of media segments. The media processing system also includes an interface module configured to present a media playback including the media segments to a user.

According to an embodiment, a media editing system includes a media capture device configured to capture media. The media editing system includes a trigger device configured to generate a plurality of trigger data, each trigger datum including a time stamp. The media editing system includes a media processing system configured to receive captured media and the trigger data and to output a plurality of media segments each corresponding to a time stamp.

According to an embodiment, a method includes capturing media data, storing the media data in temporary storage, and receiving a plurality of trigger data from a trigger device, each trigger datum including a time stamp corresponding to a real time that the trigger device generated the trigger data. The method also includes, each time the trigger datum is received, transferring the media data from the temporary storage to a permanent storage as a media segment. The method also includes uploading the media segments to a media processing system.

DETAILED DESCRIPTION

Figure 1:
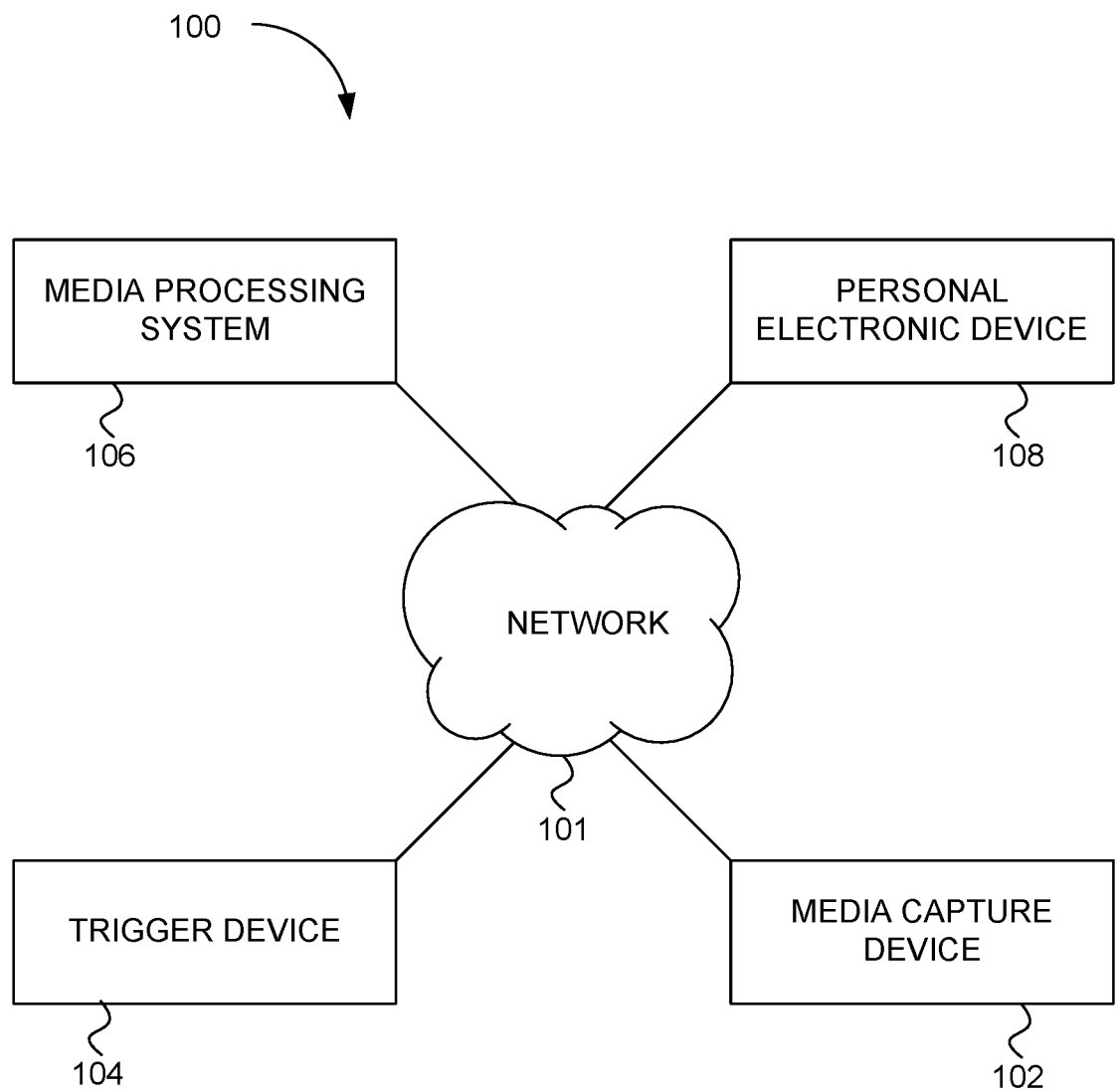
FIG. 1 is a block diagram of a media presentation system, according to an embodiment.

In the following detailed description, reference is made to the accompanying drawings, which form a part hereof. In the drawings, similar symbols typically identify similar components, unless context dictates otherwise. Other embodiments may be used and/or other changes may be made without departing from the spirit or scope of the disclosure.

FIG. 1 is a block diagram of a media presentation system 100, according to an embodiment. The media presentation system 100 includes a media capture device 102, a trigger device 104, a media processing system 106, and a personal electronic device 108. These components of the media presentation system 100 are configured to cooperate to assist in editing and presenting captured media. According to embodiments, the media presentation system 100 may include more or fewer components than shown in FIG. 1. For example, a single component may perform the functions of multiple components shown in FIG. 1. Additionally, or alternatively, a single component shown in FIG. 1 may include multiple components.

According to an embodiment, the media capture device 102, the trigger device 104, the media processing system 106, and the personal electronic device 108 communicate with each other via a network 101. The network 101 may include multiple networks including the Internet, wireless area networks, cellular networks, local area networks, or other types of networks.

According to an embodiment, the media capture device 102 is configured to capture media. The media captured by the media capture device 102 may include video media, audio media, a combination of video and audio media, and/or individual images. Accordingly, the media capture device 102 may include a camera configured to capture one or more of a video stream, an audio stream, and still images.

According to an embodiment, the media capture device 102 is configured to be coupled to a body of a user of the media capture device 102. For example, the media capture device 102 may include a head mounted camera. The head mounted camera may be configured to mount on a helmet worn by the user. The head mounted camera may be configured to be worn on a head of the user without being mounted to the helmet. The user may wear a head mounted media capture device 102 in a variety of circumstances such as while the user is participating in activities such as riding a bicycle, operating a motorcycle, riding in a kayak, riding a canoe, riding in a raft, skiing, waterskiing, skydiving, rock climbing, hiking, attending an event such as a concert, or in a variety of circumstances in which the user may wish to capture media related to the activity in which the user is participating.

According to an embodiment, the media capture device 102 may be configured to be worn by the user. The media capture device 102 may be configured to be worn on an article of clothing of the user, such as on a shirt or a jacket of the user. The media capture device 102 may be a body camera worn by a police officer or other individuals.

According to an embodiment, the media capture device 102 may be configured to be mounted to an item of sporting equipment or a vehicle. The media capture device 102 may be configured to be mounted to a bicycle, a raft, a kayak, a canoe, a motorcycle, an automobile, a jet ski, an ATV, or in another location.

According to an embodiment, the media capture device 102 may be configured to be mounted in a permanent or stationary location. The media capture device 102 may be configured to be mounted at a location to capture media related to an athletic competition, an athletic activity, a concert, a gathering, a park, a home, a secure location such as a bank, a military installation, a police installation, or in another stationary location.

According to an embodiment, as the media capture device 102 captures media, or while the media capture device 102 is ready to capture media, notable events of particular interest may occur. For example, during an athletic activity a participant may perform an outstanding maneuver, during a family activity a comical instance may occur, during a crowded gathering an injury or a crime may occur, or during an outdoor excursion a wild animal may be seen or encountered. In circumstances such as these, it may be desirable to single out such notable events from captured media. For example, if a media capture device 102 continuously captures a large amount of video during several hours of an outdoor activity, it may be desirable to be able to single out those notable events from the large amount of video. Additionally, or alternatively, participants may not desire to capture a large amount of video, but rather to capture media only related to those notable events.

According to an embodiment, the trigger device 104 enables the media presentation system 100 to readily identify the time of occurrence of the notable events. In particular, the trigger device 104 is configured to generate and output time stamped trigger data. The time stamped trigger data identifies the time of occurrence of the notable events. In particular, the trigger device 104 includes a real time clock and a trigger circuit. The real time clock keeps track of the real time. The trigger circuit includes a mechanism for generating a trigger signal upon the occurrence of the notable event. The trigger circuit may generate the trigger signal upon receiving trigger input from the user. In an embodiment, the trigger circuit may include a mechanism that enables the trigger circuit to generate the trigger signal without intentional intervention by the user. The trigger circuit may operate to generate the trigger signals upon the occurrence of the notable event.

According to an embodiment, the user of the trigger device 104 may intentionally provide trigger inputs to the trigger device 104 upon the occurrence of the notable events. For example, when the user of the trigger device 104 sees or hears that the notable event has occurred, the user may operate a switch, such as by pressing a button, flipping a toggle, manipulating a slider, or otherwise providing trigger input to the trigger device 104 indicating that a trigger event has occurred. When the trigger device 104 receives the trigger input from the user, the trigger device 104 generates the trigger signal.

In one embodiment, the trigger device 104 is configured to generate the trigger signals in response to stimuli other than intentional user input. For example, the trigger device 104 may be configured to generate the trigger signal based on the tone or intensity of audio signals received by the trigger device 104. The trigger device 104 may be configured to generate the trigger signal based on motions sensed by the trigger device 104. The trigger device 104 may be configured to generate the trigger signal based on the intensity of light or based on sudden changes in lighting. Accordingly, the trigger device 104 may include sensors such as microphones, motion sensors, photo sensors, or other kinds of sensors, and may be configured to generate the trigger signals based on sensed parameters.

According to an embodiment, when the trigger circuit of the trigger device 104 generates the trigger signal, the trigger device 104 reads the real time from the real time clock and generates the time stamped trigger data that indicates the occurrence of the trigger event and the real time at which the trigger event occurred. Each time the trigger circuit generates a trigger signal, the trigger device 104 generates trigger data indicating the occurrence of the trigger event and including a time stamp indicating the time at which the trigger event occurred. Thus, the trigger device 104 generates the trigger data indicating the time of the one or more trigger events.

In one embodiment, the trigger data includes location data corresponding to the location of the trigger device 104 that generates the trigger data. Thus, the trigger data not only includes the time stamp that indicates the time at which the trigger data was generated, but also the location data indicating the location of the trigger device 104 when the trigger data was generated.

In one embodiment, the trigger data may include an audio signal corresponding in time to each time stamped trigger data. Thus, when the trigger device 104 generates a trigger signal, the trigger device 104 also records sound from an environment of the trigger device 104. Accordingly, the trigger device 104 may include a microphone capable of recording sounds. Each trigger datum may include the time stamp and the audio signal.

In one embodiment, the trigger device 104 is configured to wirelessly communicate with the media capture device 102. In particular, the trigger device 104 is configured to transmit the trigger data to the media capture device 102. The trigger device 104 may be configured to communicate with the media capture device 102 via Bluetooth, Wi-Fi protocol, Zigbee protocol, or with other kinds of wireless communication protocols. The trigger device 104 may be configured to transmit the trigger data to the media capture device 102.

In one embodiment, the trigger device 104 is configured to wirelessly transmit the trigger data to the media capture device 102 immediately upon generating new trigger data. Thus, when the trigger device 104 generates a trigger signal indicating the occurrence of a notable event, the trigger device 104 transmits the trigger data to the media capture device 102. Each time the trigger device 104 generates new trigger data, the trigger device 104 transmits the new trigger data to the media capture device 102.

In one embodiment, the trigger device 104 is configured to wirelessly transmit the trigger data to the media capture device 102 after the end of an activity for which the media capture device 102 captured media. For example, the user may manipulate the trigger device 104 indicating that the trigger device 104 should now transmit all trigger data to the media capture device 102. Additionally, or alternatively, the media capture device 102 may communicate with the trigger device 104 and request all trigger data from the trigger device 104. Additionally, or alternatively, after the end of the activity, the trigger device 104 and the media capture device 102 may be coupled together in a wired connection, and the trigger device 104 may provide the trigger data to the media capture device 102.

In one embodiment, the media capture device 102 is a retrospective media capture device. Rather than permanently capturing a large amount of media during a prolonged activity or a prolonged amount of time, the media capture device 102 may be configured to permanently capture only selected events. Accordingly, the media capture device 102 may be configured to continuously capture media data, such as a stream of video and/or audio data, and to store the media data in a temporary storage. The temporary storage may include a circular buffer, a first in first out (FIFO) memory, or another type of temporary storage. As the temporary storage fills up with the media data, the oldest media data is removed from the temporary storage and the newest media data is written to the temporary storage. Thus, at any given moment, the temporary storage includes captured media data from the immediately preceding several seconds or minutes. When the media capture device 102 receives trigger data from the trigger device 104, the media capture device 102 transfers the media data in the temporary storage to a permanent storage which will not be overwritten as the media capture device 102 continues to capture the media data. The media capture device 102 may be configured to continue to store newly captured media data in the permanent storage for a selected amount of time after the trigger data has been received from the trigger device 104. In this way, the media capture device 102 may retrospectively capture media data, such as audio and/or video data, from a period of time immediately preceding the receipt of a trigger signal.

In one embodiment, throughout the course of an activity, the media capture device 102 may receive multiple trigger data from the trigger device 104 at various times. Each time the media capture device 102 receives new trigger data from the trigger device 104, the media capture device 102 retrospectively captures media content to the permanent storage. Thus, the media capture device 102 may be operated in a mode that does not cause the media capture device 102 to permanently record hours of continuous data. Instead, the media capture device 102 may be operated in a retrospective capture mode in which the media capture device 102 continuously stores new captured media in a relatively small temporary storage and only permanently records media data upon the receipt of trigger data from the trigger device 104.

In one embodiment, the media capture device 102 generates a media file that includes only segments of media data permanently and retrospectively captured in response to the receipt of trigger data from the trigger device 104. For example, at the conclusion of an activity, the user of the media capture device 102 may manipulate the media capture device 102 to indicate that the activity has concluded and that the media capture device 102 should now finalize the captured media. In response, the media capture device 102 may generate multiple individual media files each corresponding to a portion of media data surrounding the receipt of a trigger event. Additionally, or alternatively, the media capture device 102 may generate a single media file that includes multiple segments of media data each corresponding to a time of receipt of a trigger datum from the trigger device 104.

In one embodiment, the media capture device 102 is configured to continuously capture media data, such as video data and/or audio data, throughout the course of an activity or a selected period of time. While the media capture device 102 captures media data, the user of the trigger device 104 may cause the trigger device 104 to generate trigger data at various times corresponding to notable events. The trigger device 104 may output the trigger data to the media capture device 102. The media capture device 102 may mark the captured media data in accordance with the time stamp of the trigger data to indicate in the captured media data those times at which the trigger data was received. The media capture device 102 may generate and output a media file that includes the captured media data and markers indicating the times at which trigger data was received. The user of the media capture device 102 may view the media file on an external device, such as the personal electronic device 108, and may easily identify the locations of notable events in the media data file.

In one embodiment, the media capture device 102 is configured to output multiple media files at the conclusion of an activity for which the media capture device 102 captured media data. The media capture device 102 may be configured to generate a media file that includes all of the captured media with markers indicating times at which trigger data was received. The media capture device 102 may be configured to generate a second media file that includes the compilation of segments, each corresponding to the receipt of the trigger data. The media capture device 102 may be configured to generate a plurality of individual media files each for a segment of captured media corresponding to receipt of the trigger data.

In one embodiment, the trigger device 104 is configured to communicate with the media processing system 106. For example, the trigger device 104 may be configured to transfer trigger data to the media processing system 106 at the conclusion of an activity, event, or period of time during which the media capture device 102 captured media. The trigger device 104 transfers the trigger data, including the trigger data for each trigger event that occurred during the activity. Thus, the trigger device 104 may transfer the trigger data for a plurality of trigger events to the media processing system 106.

In one embodiment, the trigger device 104 may be configured to automatically upload the trigger data to the media processing system 106 when the trigger device 104 is connected to a wireless network. Many kinds of activities may take place at locations where the trigger device 104 cannot connect to a wireless network, such as for outdoor activities at remote locations. In these cases, the trigger device 104 will not transmit the trigger data to the media processing system 106 until the trigger device 104 is connected to a wireless network. Once the trigger device 104 is again connected to a wireless network, the trigger device 104 uploads the trigger data to the media processing system 106.

In one embodiment, the trigger device 104 may include a software application associated with the media processing system 106. The trigger device 104 may store the software application in a computer readable medium, i.e., a memory, of the trigger device 104. The trigger device 104 may execute the software application using one or more processors of the trigger device 104. The software application may cause the trigger device 104 to transmit the trigger data to the media processing system 106.

In one embodiment, the media capture device 102 is configured to upload captured media data to the media processing system 106 upon completion of a media capture activity. For example, the media capture device 102 may be configured to upload the entirety of the captured media data after the media capture activity. Additionally, or alternatively, the media capture device 102 may be configured to upload the entirety of the captured media and/or individual captured media segments.

In one embodiment, the media capture device 102 may include a software application associated with the media processing system 106. The media capture device 102 may store the software application in a computer readable medium, i.e., a memory, of the media capture device 102. The media capture device 102 may execute the software application using one or more processors of the media capture device 102. The software application may cause the media capture device 102 to transmit captured media data to the media processing system 106.

In one embodiment, the media processing system 106 is configured to receive the trigger data from the trigger device 104 and the captured media data from the media capture device 102. The media processing system 106 is configured to generate edited media data from the captured media data based on the trigger data. The media processing system 106 may output the edited media data to an external device such as the personal electronic device 108 or the media capture device 102.

In one embodiment, the media processing system 106 is configured to generate a plurality of media segments from the captured media data. Each media segment corresponds to a portion of the captured media data at a time associated with a respective trigger event from the trigger data. The media processing system 106 may output the plurality of media segments to an external device.

In one embodiment, the media processing system 106 is configured to generate, for each media segment corresponding to the trigger event from the trigger data, a thumbnail image. The user may navigate to a selected thumbnail image to access the media segment corresponding to a trigger event from the trigger data.

In one embodiment, the media processing system 106 is configured to generate a media file that includes each media segment. The media processing system 106 is configured to present the media file with a timeline that includes markers indicating the segments corresponding to the trigger events. The media file may include the entirety of the captured media from the media capture device 102, together with markers on the timeline indicating the locations in the media file of the segments corresponding to the trigger events from the trigger data. Alternatively, or additionally, the media file may include a compilation of each of the segments corresponding to the trigger events from the trigger data. The mark on the timeline may include an indication such as a thumbnail image from the segment corresponding to the mark on the timeline. Additionally, or alternatively, the mark on the timeline may include indications other than a thumbnail image.

In one embodiment, the media processing system 106 is configured to output the edited media files to the personal electronic device 108. The personal electronic device 108 is configured to enable the user to access and view the edited media files generated by the media processing system 106. The personal electronic device 108 may include a mobile phone, a laptop computer, a desktop computer, a tablet, or another kind of personal electronic device that includes a display for displaying media content.

In one embodiment, the personal electronic device 108 includes a software application associated with the media processing system 106. The personal electronic device 108 may store the software application in a computer readable medium, i.e., a memory, of the personal electronic device 108. The personal electronic device 108 may execute the software application using one or more processors of the personal electronic device 108. The software application may cause the personal electronic device 108 to communicate with the media processing system 106 and to receive edited media content files from the media processing system 106.

In one embodiment, the media processing system 106 includes one or more servers executing media processing software on computing resources of the one or more servers. The media processing system 106 may include cloud-based processing resources that enable the media processing system 106 to execute resource intensive media editing operations. Users of the media processing system 106 may thus utilize the media processing system 106 to generate edited media files based on the trigger data from the trigger device 104 and the captured media from the media capture device 102. The media capture device 102, the trigger device 104, and the personal electronic device 108 may communicate with the media processing system 106 via the network 101. The network 101 can include one or more of the Internet, wireless networks, local area networks, or other communication networks configured to enable the components of the media presentation system 100 to communicate with each other.

In one embodiment, the personal electronic device 108 includes all or a portion of the media processing system 106. In this case, the personal electronic device 108 receives the trigger data and the captured media data from the trigger device 104 and the media capture device 102. The personal electronic device 108 executes media processing software associated with the media processing system 106 and generates edited media files based on the captured media data and the trigger data.

In one embodiment, the trigger device 104 can be part of the media capture device 102. In this case, the user may operate the media capture device 102 to generate trigger data and to cause the media capture device 102 to retrospectively capture media data.

In one embodiment, each of the plurality of media segments includes a portion beginning prior to the time stamp of the respective trigger data. For example, the media segment may include media captured a few seconds prior to the time stamp of the trigger data. In an embodiment, a media segment includes up to a minute prior to the time stamp of the trigger data. In another embodiment, a media segment may include more than a minute prior to the time stamp of the trigger data.

Figure 2:
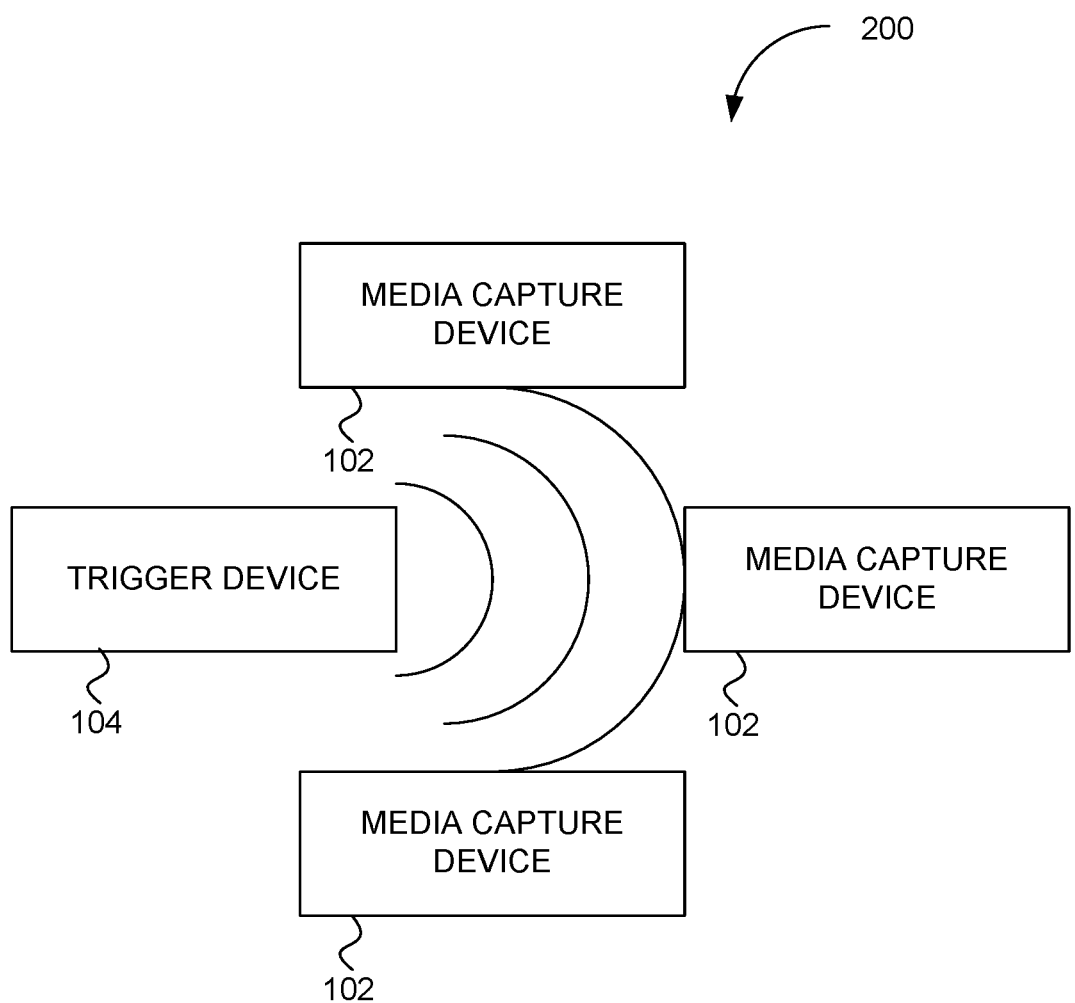
FIG. 2 is a block diagram of a media presentation system, according to an embodiment.

FIG. 2 is a block diagram of a media presentation system 200, according to an embodiment. The media presentation system 200 may include a trigger device 104 and a plurality of media capture devices 102. The trigger device 104 and the plurality of media capture devices 102 cooperate together to assist in editing captured media. In an embodiment, a media capture device 102 may be identified (e.g., dynamically identified) using local discovery of media capture devices 102 proximal to an event experienced by the user of the trigger device 104. Accordingly, a trigger may cause a "harvesting" of captured media from media capture devices 102 unknown to the user at a time prior to or even contemporaneously with the notable event marked by the user.

In one embodiment, the trigger device 104 is configured to generate and output time stamped trigger data. The time stamped trigger data identifies the time of occurrence of corresponding notable events. In particular, the trigger device 104 may include a real time clock and a trigger circuit. The real time clock keeps track of the real time. The trigger circuit includes a mechanism for receiving a trigger signal from the user upon an occurrence of a notable event. The trigger circuit can generate the trigger signal upon receiving trigger input from the user. In embodiments, the trigger circuit may include a mechanism that enables the trigger circuit to generate the trigger signal without intentional intervention by the user.

In one embodiment, each media capture device 102 is configured to capture media. The media captured by each media capture device 102 may include video media, audio media, a combination of video and audio media, and/or individual images. One or more media capture devices 102 may include a camera configured to capture one or more of a video stream, an audio stream, and still images. In one embodiment, one or more media capture devices 102 may include retrospective capture capabilities as described in relation to FIG. 1.

In one embodiment, the trigger device 104 is configured to communicate with each of the media capture devices 102. The trigger device 104 may transmit time stamped trigger data to each of the media capture devices 102. The trigger device 104 may communicate with the media capture devices 102 in order to identify media capture devices 102 that are present and in an operational state to capture media.

In one embodiment, when the trigger device 104 generates a trigger signal indicative of a notable event, the trigger device 104 outputs trigger data to one or more of the media capture devices 102. Each of the media capture devices 102 may receive the trigger data from the trigger device 104, or alternatively may be queried by a media processing system 106 at a later time. One or more of the media capture devices 102 may be capable of retrospectively capturing media data on receipt of the trigger signal. Additionally or alternatively, one or more of the media capture devices 102 may add markers into the captured media indicating the location within the captured media corresponding to the receipt of the trigger data. Additionally or alternatively, the trigger signals generated by the trigger device 104 may cause a media processing system 106 to parse captured media streams from the media capture devices 102 to retrieve media segments corresponding to a notable event identified by the user.

In one embodiment, the plurality of media capture devices 102 includes a predetermined linked group of media capture devices 102. The user, or users, of the media capture devices 102 may link the media capture devices 102 together prior to utilizing the media capture devices 102 in a situation to capture media. The media capture devices 102 each store data indicating which other media capture devices 102 are in the predetermined group.

In one embodiment, the predetermined group of media capture devices 102 is associated with the trigger device 104. When the trigger device 104 generates trigger data, the trigger device 104 may output the trigger data to each of the media capture devices 102 of the predetermined group of media capture devices 102. In one embodiment, the media capture devices 102 may pass trigger data to each other in case one of the media capture devices 102 is outside the range of the trigger device 104 but still within the range of another of the media capture devices 102.

In one embodiment, the trigger device 104 is configured to discover nearby media capture devices 102. The trigger device 104 may be configured to discover media capture devices 102 that have a media capture zone proximate to the trigger device 104. Thus, when the trigger device 104 generates time stamped trigger data, the trigger device 104 may output the time stamped trigger data to each of the media capture devices 102 that are in a position to capture media in an area local to the trigger device 104.

In one embodiment, the media presentation system 200 includes a media processing system 106. The media processing system 106 may include a server or cloud-based computing system configured to read captured media from each of the media capture devices 102. The media processing system 106 may also be configured to receive trigger data from the trigger device 104. The media processing system 106 may process the captured media in accordance with the trigger data. The media processing system 106 may generate media segments from each media capture device 102 for each trigger event in the trigger data. The media processing system 106 may output edited media data including media segments from each of the media capture devices 102.

In one embodiment, the media processing system 106 may determine which media capture devices 102 were in the vicinity of the trigger device 104 each time trigger data was generated based on the location data included in the trigger signal, as well as the location data stored by the media capture devices 102. The media processing system 106 may generate media segments from the captured media of each media capture device 102 determined to be within the vicinity of the trigger device 104.

In one embodiment, the media processing system 106 is configured to output the plurality of media segments as a playback. The media processing system 106 is configured to assemble the plurality of media segments in the time sequence corresponding to the sequence of time stamps. The media processing system 106 is configured to output the sequence of segments as a playback. The playback may be continuous, with substantially no break between segments. Alternatively, when the media processing system 106 assembles the media segments, the media processing system 106 may insert a fade between successive media segments.

In one embodiment, the media processing system 106 is configured to output the plurality of media segments as a playback by assembling at least a portion of the plurality of media segments as panes in a display list. The media processing system 106 may be configured to simultaneously output a plurality of panes from the display list on the user interface. In one embodiment, the media processing system 106 is configured to output the plurality of media segments as a playback comprising the plurality of media segments by displaying the media segments from respective media capture devices 102 corresponding to a single time stamp. In one embodiment, the media processing system 106 may be configured to output the plurality of media segments as a playback by outputting the plurality of media segments in a media stream.

In one embodiment, the media processing system 106 is configured to output the plurality of media segments as a media file.

In one embodiment, the media processing system 106 is configured to read the plurality of media segments from the media capture device 102 by reading a media file spanning a plurality of stamped times. The media processing system 106 then processes the media file into separate segments based on the stamped times.

In one embodiment, the media processing system 106 is configured to read the plurality of media segments from a media capture device 102 by excluding portions of the captured media not corresponding to a trigger. Thus, the media processing system 106 retrieves from the media capture device 102 only those portions of the captured media that correspond to a trigger event.

Figure 3:
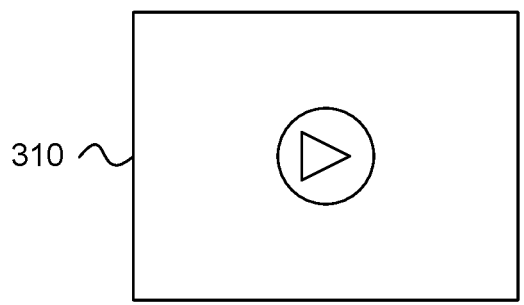
FIG. 3 is an illustration of thumbnails representing media output files, according to an embodiment.
Figure 3:
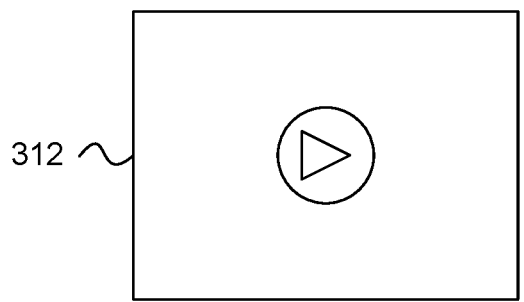

FIG. 3 is an illustration of how media files are output by the media processing system 106, according to an embodiment. The media playback may be presented on a display of the personal electronic device 108. The media processing system 106 has generated a file 310 that is a full video corresponding to an entirety of media captured by a media capture device 102. The media processing system 106 has also generated a file 312 that includes a compilation of segments from the media captured by the media capture device 102.

In one embodiment, when the media processing system 106 reads captured media data from a media capture device 102, the media processing system 106 may process the captured media so that the captured media can be conveniently viewed or otherwise consumed by a user.

In one example, in accordance with one embodiment, the user operates a media capture device 102 during an outdoor activity. The user operates the media capture device 102 in the mode that causes the media capture device 102 to capture media during the entirety of the activity. The duration of the activity is three hours, thirteen minutes, and seven seconds.

In this example, in accordance with one embodiment, the user also operates a trigger device 104 to mark the occurrence of notable events during the outdoor activity. Each time a notable event occurs, the user manipulates the trigger device 104 to generate time stamped trigger data. During the outdoor activity, the user causes the trigger device 104 to generate twelve time stamps of the trigger data corresponding to the notable events that occurred during the outdoor activity.

In one embodiment, at the end of the outdoor activity, the media processing system 106 receives the captured media from the media capture device 102. The media processing system 106 also receives the trigger data, either from the trigger device 104, or from the media capture device 102. The media processing system 106 may receive the trigger data from the media capture device 102 as markers placed in the captured media, or as separate triggers.

In one embodiment, the media processing system 106 generates the full video file 310 from the captured media. The full video file 310 corresponds to the entirety of the captured media from the outdoor activity. The full video file 310 is three hours, thirteen minutes, and seven seconds long.

In one embodiment, the media processing system 106 also generates a highlight compilation file 312 corresponding to a compilation of media segments from the captured media. Each media segment includes a segment of the captured media corresponding to a time stamp in the trigger data. The highlight compilation file 312 includes twelve segments compiled together having a total duration of four minutes, 27 seconds. The media processing system 106 may output the highlight compilation file 312 via the personal electronic device 108.

In one embodiment, the media processing system 106 outputs only the highlight compilation file 312. In this case, the media processing system 106 either does not read the entirety of the captured media from the media capture device 102, or does read the entirety of the captured media but only generates and outputs the highlight compilation file 312.

Figure 4:
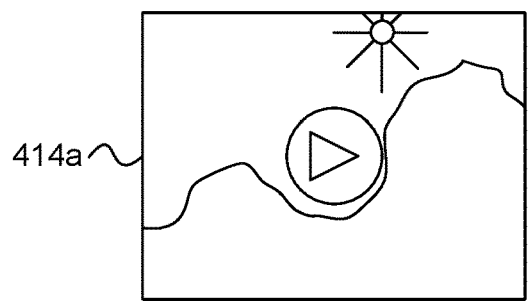
FIG. 4 is an illustration of thumbnails representing segments of captured media, according to an embodiment.
Figure 4:
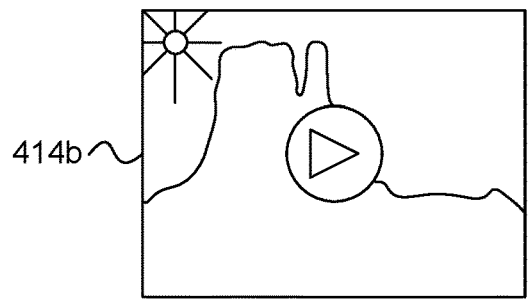
Figure 4:
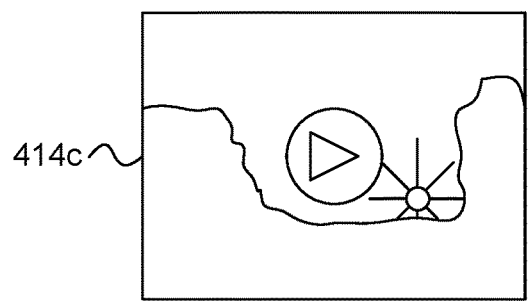

FIG. 4 is an illustration of how a media processing system 106 outputs media files in a media playback, according to an embodiment. The media playback may be presented on a display of the personal electronic device 108. The media processing system 106 displays a separate thumbnail for each of a plurality of segments of media captured by a media capture device 102. Each segment corresponds to a respective time stamp from time stamped trigger data generated by a trigger device 104.

In one example, in accordance with one embodiment, the media processing system 106 reads captured media from the media capture device 102. The media processing system 106 also reads time stamped trigger data generated by the trigger device 104. The time stamped trigger data includes three time stamps. The media processing system 106 generates three media segments from the captured media. The media processing system 106 outputs a thumbnail for each media segment. In particular, the media capture device 102 generates a first thumbnail 414a corresponding to a first segment with a time stamp of 3:55 PM and a duration of 37 seconds. The media processing system 106 outputs a second thumbnail 414b corresponding to a second segment with a time stamp of 4:01 PM and a duration of 15 seconds. The media processing system 106 outputs a third thumbnail 414c corresponding to a third segment with a time stamp of 6:15 PM and a duration of one minute, three seconds. A user may select the thumbnail 414a, 414b, or 414c to play back the respective segment.

In one embodiment, each trigger data may include a first time stamp indicating initiation of a notable event, and a second time stamp indicating the end of the notable event. A user may operate the trigger device 104 a first time to indicate the end of the notable event. This can cause the media capture device 102 (or a media processing system 106 in combination with continuously operating media capture devices 102) to retrospectively capture the notable event and to stop capture when the notable event has ended. Thus, each media segment may have a duration in accordance with a duration of the notable event. Alternatively, each trigger signal may cause the media capture device 102 to capture media for a preselected period of time. Alternatively, the media processing system 106 may generate segments of a preselected length for each trigger signal.

Figure 5:
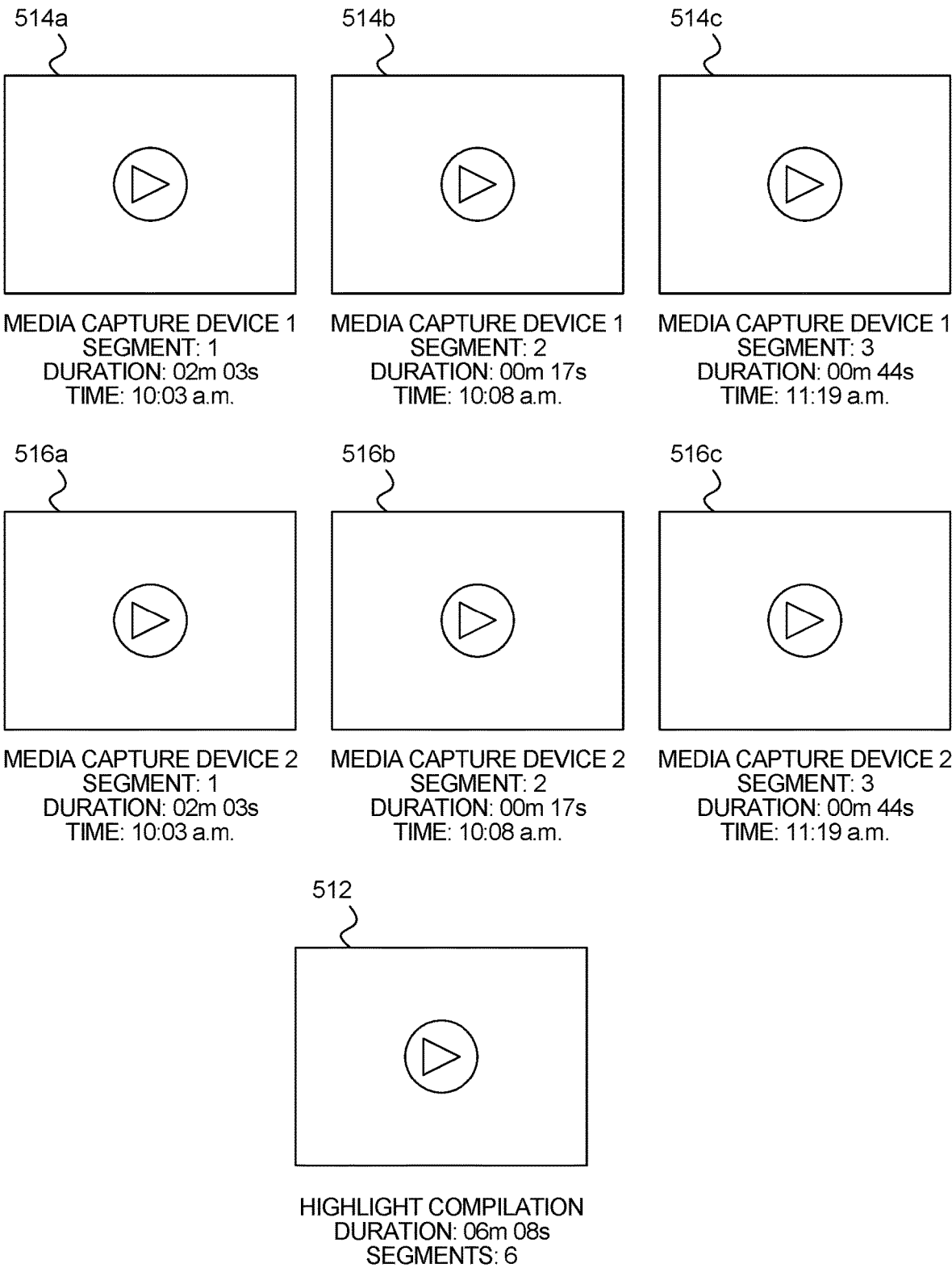
FIG. 5 is an illustration of thumbnails representing segments of captured media from multiple media capture devices, according to an embodiment.

FIG. 5 is an illustration of how a media processing system 106 outputs media files in a media playback, according to an embodiment. The media playback may be presented on a display of the personal electronic device 108. The media processing system 106 reads captured media from multiple media capture devices 102. The media processing system 106 also receives time stamped trigger data indicating a plurality of trigger events. The media processing system 106 generates, for each trigger event in the trigger data, a media segment for each media capture device 102. The media processing system 106 may optionally generate a highlight compilation that includes each of the segments from each media capture device 102. The media processing system 106 displays a separate thumbnail for each of the media segments and for the highlight compilation.

In one example, in accordance with one embodiment, the media processing system 106 reads captured media from a first media capture device 102 and from a second media capture device 102. The media processing system 106 also reads trigger data either from a trigger device 104 or from the media capture devices 102. The trigger data includes three time stamps corresponding to trigger events. A first trigger event has a time stamp of 10:03 AM. A second trigger event has a time stamp of 10:08 AM. A third trigger event has a time stamp of 11:19 AM. The media processing system 106 generates a media segment with a thumbnail 514a, including media captured by the first media capture device 102 corresponding to the first trigger event. The media processing system 106 generates a media segment as a thumbnail 514b, including media captured by the first media capture device 102 corresponding to the second trigger event. The media processing system 106 generates a media segment as a thumbnail 514c including media captured by the first media capture device 102 corresponding to the third trigger event. The media processing system 106 generates a media segment as a thumbnail 516a, including media captured by the second media capture device 102 corresponding to the first trigger event. The media processing system 106 generates a media segment as a thumbnail 516b, including media captured by the second media capture device 102 corresponding to the second trigger event. The media processing system 106 generates a media segment as a thumbnail 516c, including media captured by the second media capture device 102 corresponding to the third trigger event.

In one embodiment, the media processing system 106 also generates a highlight compilation as a thumbnail 512, corresponding to a compilation of all of the media segments from each of the media capture devices 102.

In one embodiment, the user may select any of these thumbnails 512, 514a, 514b, 514c, 516a, 516b, 516c in order to view the respective media segment or compilation.

Figure 6:
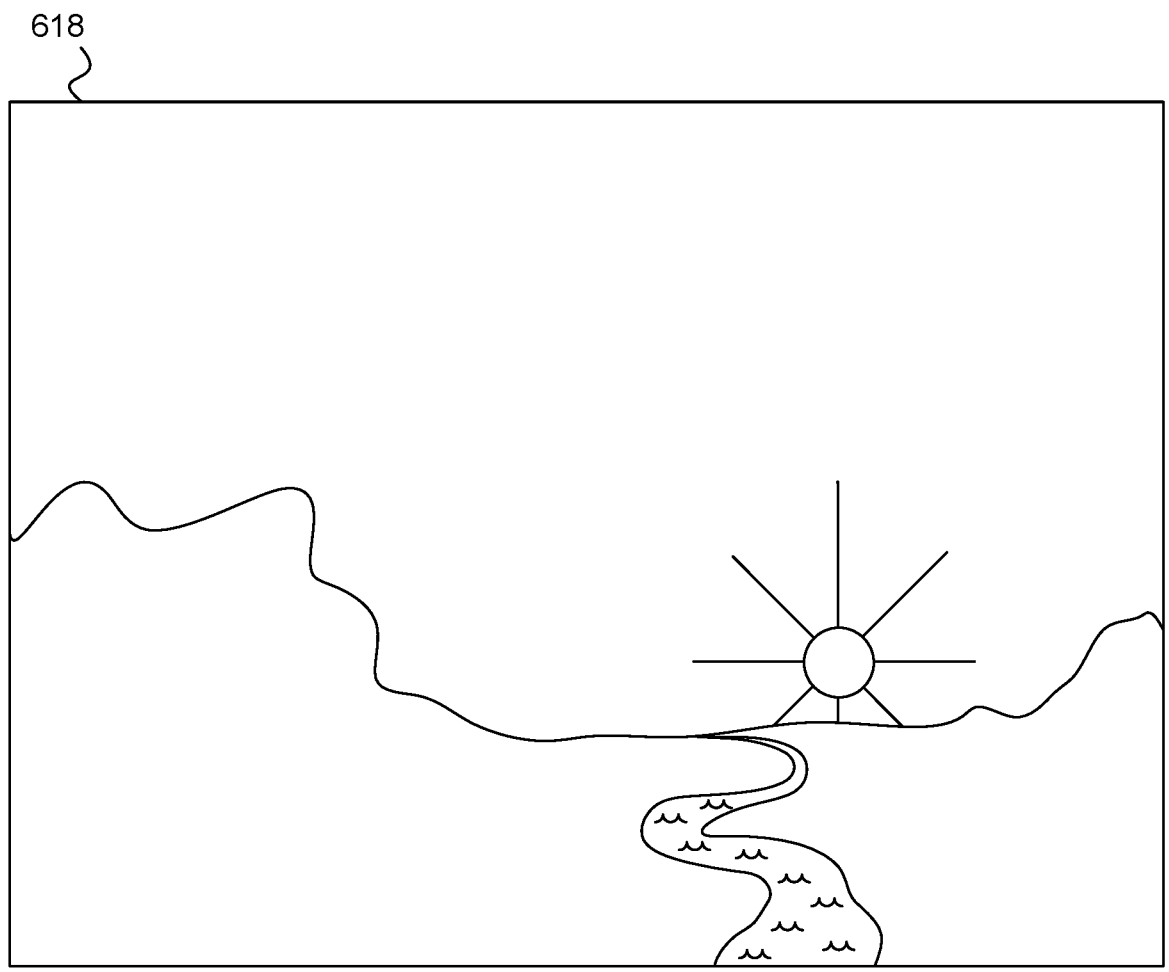
FIG. 6 is an illustration of a media playback interface including a timeline of a captured media file with markers indicating times at which trigger data were generated, according to an embodiment.

FIG. 6 is an illustration of how a media processing system 106 outputs media files in a media playback, according to an embodiment. The media playback may be presented on a display of the personal electronic device 108. The media processing system 106 reads captured media from a media capture device 102. The media processing system 106 also receives time stamped trigger data indicating a plurality of trigger events. The media processing system 106 generates a media file that includes the captured media. The media file includes markers on a timeline indicating locations within the media file corresponding to trigger events.

In one example, in accordance with one embodiment, the media processing system 106 captures media from the media capture device 102. The media processing system 106 also receives time stamped trigger data corresponding to four trigger events that occurred while the media capture device 102 captured media. The media processing system 106 outputs a media file 618, including the captured media from the media capture device 102. The media file 618 includes markers 620a-620d, each corresponding to a time stamp from the trigger data. The user may utilize the markers 620a-620d to quickly navigate to portions of the media file 618 that correspond to the trigger events. Additionally, or alternatively, the markers 620a-620d may include thumbnail images indicating the content at the marked locations.

Figure 7:
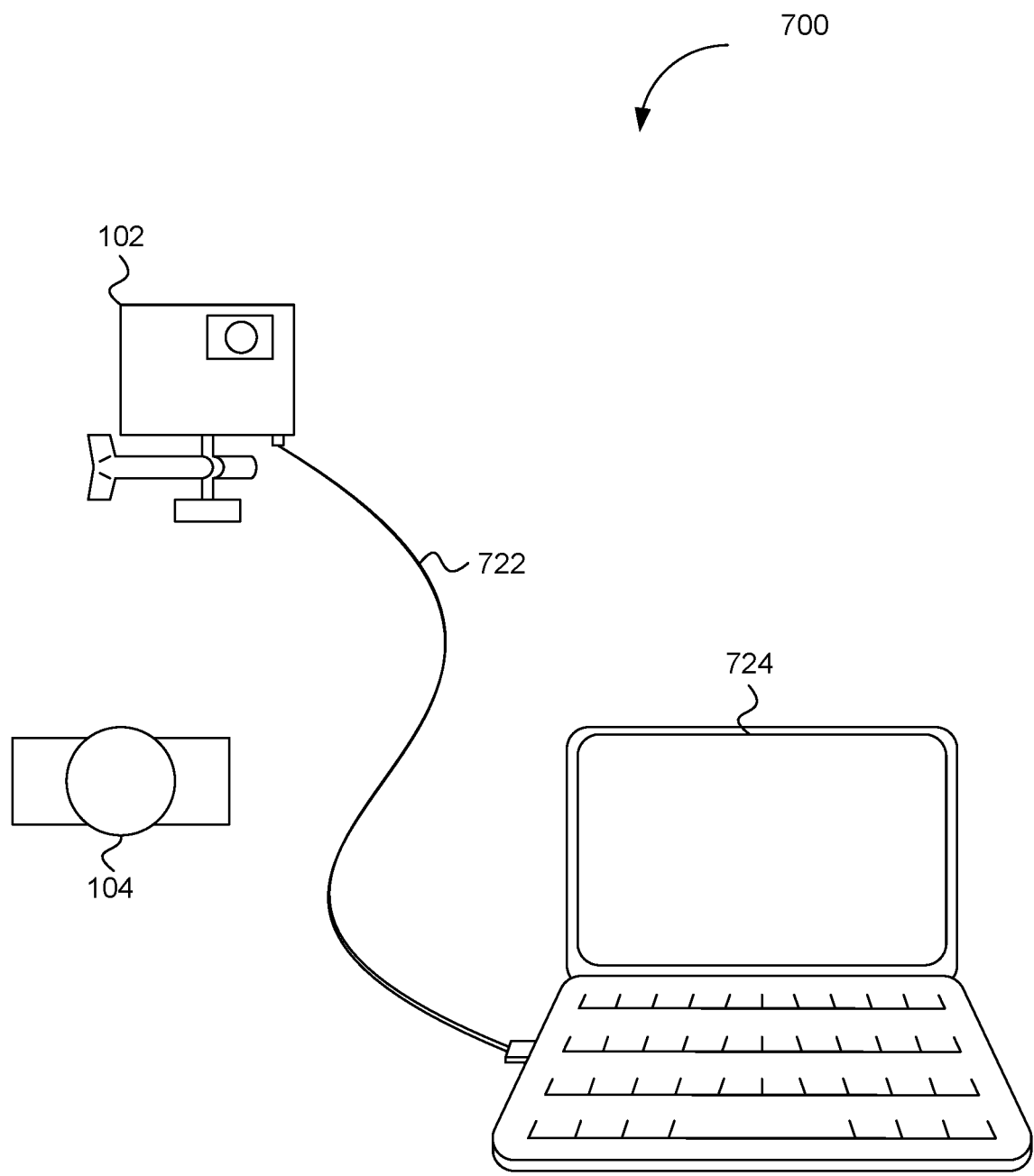
FIG. 7 is an illustration of a media presentation system, according to an embodiment.

FIG. 7 is an illustration of a media presentation system 700, according to an embodiment. The media presentation system 700 includes a media capture device 102, a trigger device 104, and a personal electronic device 724.

In one embodiment, after a user has operated the media capture device 102 to capture media, and the trigger device 104 to generate trigger data, the user seeks to upload and process the captured media in accordance with the trigger data. The user outputs the captured media from the media capture device 102 to the personal electronic device 724. This may be done wirelessly, or via a wired connection 722. The personal electronic device 724 also receives the trigger data, either from the trigger device 104 or from the media capture device 102. The personal electronic device 724 utilizes a media processing system 106 to process the captured media from the media capture device 102 in accordance with the trigger data from the trigger device 104. The media processing system 106 processes the captured media in accordance with the trigger data to generate and output one or more media playback files. The media playback files may include a plurality of segments in accordance with the trigger data, a compilation of the plurality of segments, and/or a full media file including portions of the captured media that do not correspond to a trigger event.

In one embodiment, the media processing system 106 includes a software application executed by the media capture device 102. The software application corresponds to instructions stored in a computer readable medium of the personal electronic device 724 and executed by one or more processors of the personal electronic device 724.

In one embodiment, the media capture device 102 outputs the captured media to the media processing system 106 hosted on one or more servers, or hosted in the cloud. The media processing system 106 receives the captured media and the trigger data, processes the captured media, and outputs the captured media for playback on the personal electronic device 724.

In one embodiment, the personal electronic device 724 includes a laptop computer, a tablet, a mobile phone, a desktop computer, or another kind of computing device.

Figure 8:
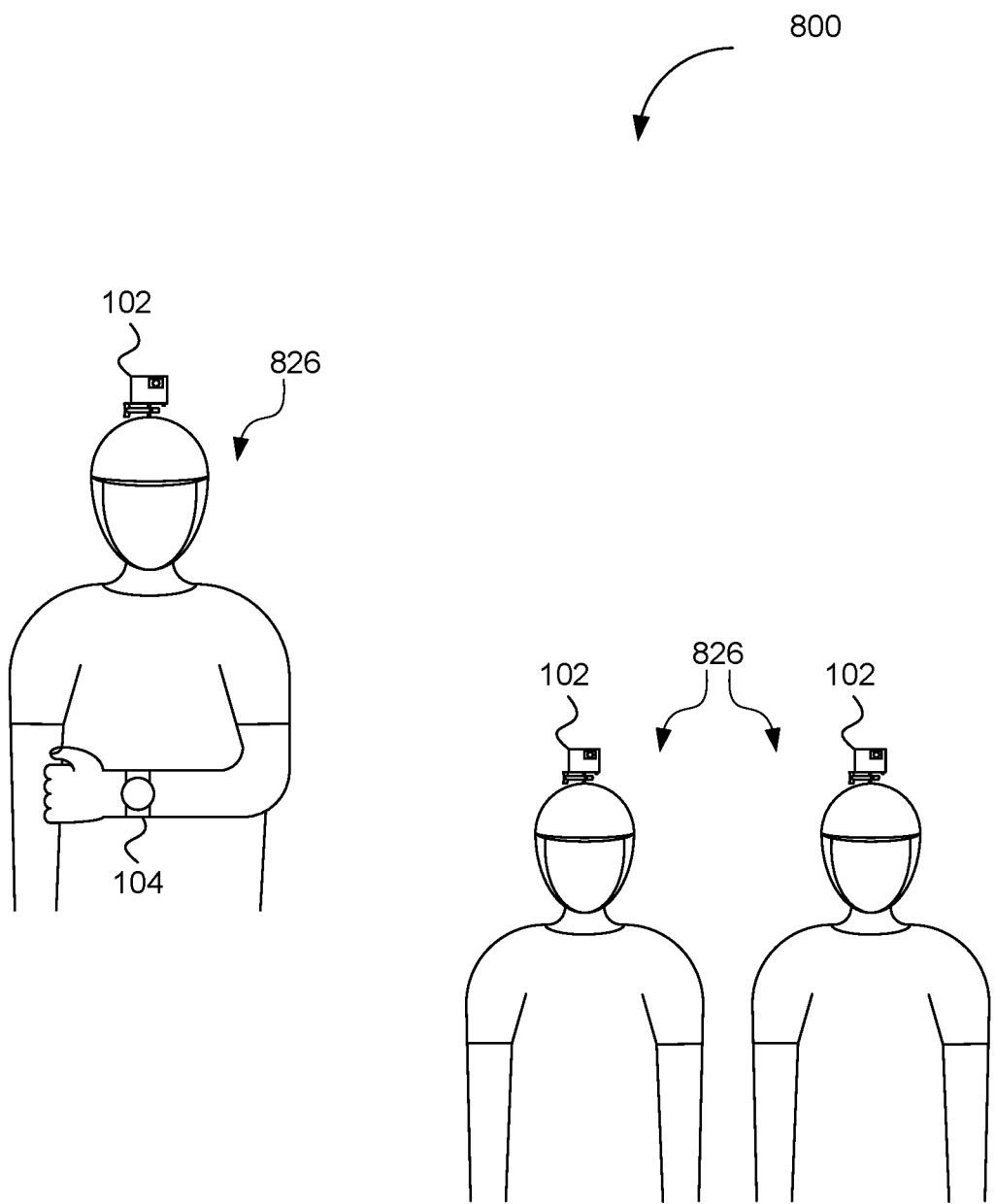
FIG. 8 is an illustration of a portion of a system including multiple media capture devices and a trigger device, according to an embodiment.

FIG. 8 is an illustration of a system 800 including a plurality of media capture devices 102 operatively coupled to a trigger device 104, according to an embodiment. The system 800 includes three media capture devices 102 and the trigger device 104. Three users 826 each have a media capture device 102 mounted on a helmet. At least one of the users 826 is wearing the trigger device 104 around their wrist.

In one embodiment, as the users 826 participate in an activity, the media capture devices 102 are in retrospective capture mode, as described previously. Upon the occurrence of a notable event, the user 826 that is wearing the trigger device 104 causes the trigger device 104 to generate trigger data. The trigger device 104 outputs the trigger data to the media capture devices 102. The media capture devices 102 retrospectively capture media corresponding to a period of time beginning before the receipt of the trigger data and extending after the receipt of the trigger data for a selected period of time.

In one embodiment, multiples of users 826 wear trigger devices 104. Each trigger device 104 is configured to communicate with each of the media capture devices 102. Thus, any of the users 826 may cause each of the media capture devices 102 to retrospectively capture media by manipulating the respective trigger devices 104.

Figure 9:
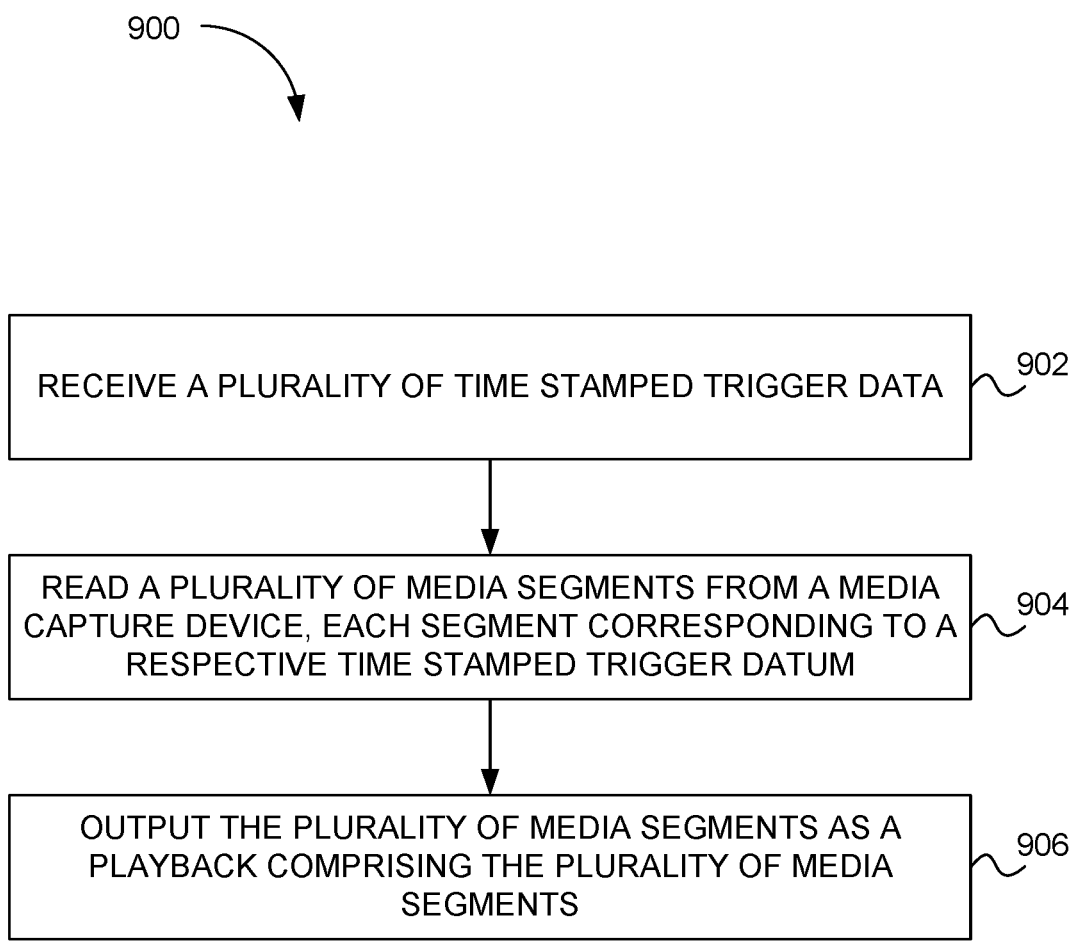
FIG. 9 is flow diagram of a computer method for presenting a media playback, according to an embodiment.

FIG. 9 is a flow diagram of a process 900, according to an embodiment. At 902, a plurality of time stamped trigger data is received. At 904, a plurality of media segments is read from a media capture device. Each segment corresponds to a respective time stamped trigger datum. At 906, a plurality of media segments is output as a playback, including a plurality of media segments.

Figure 10:
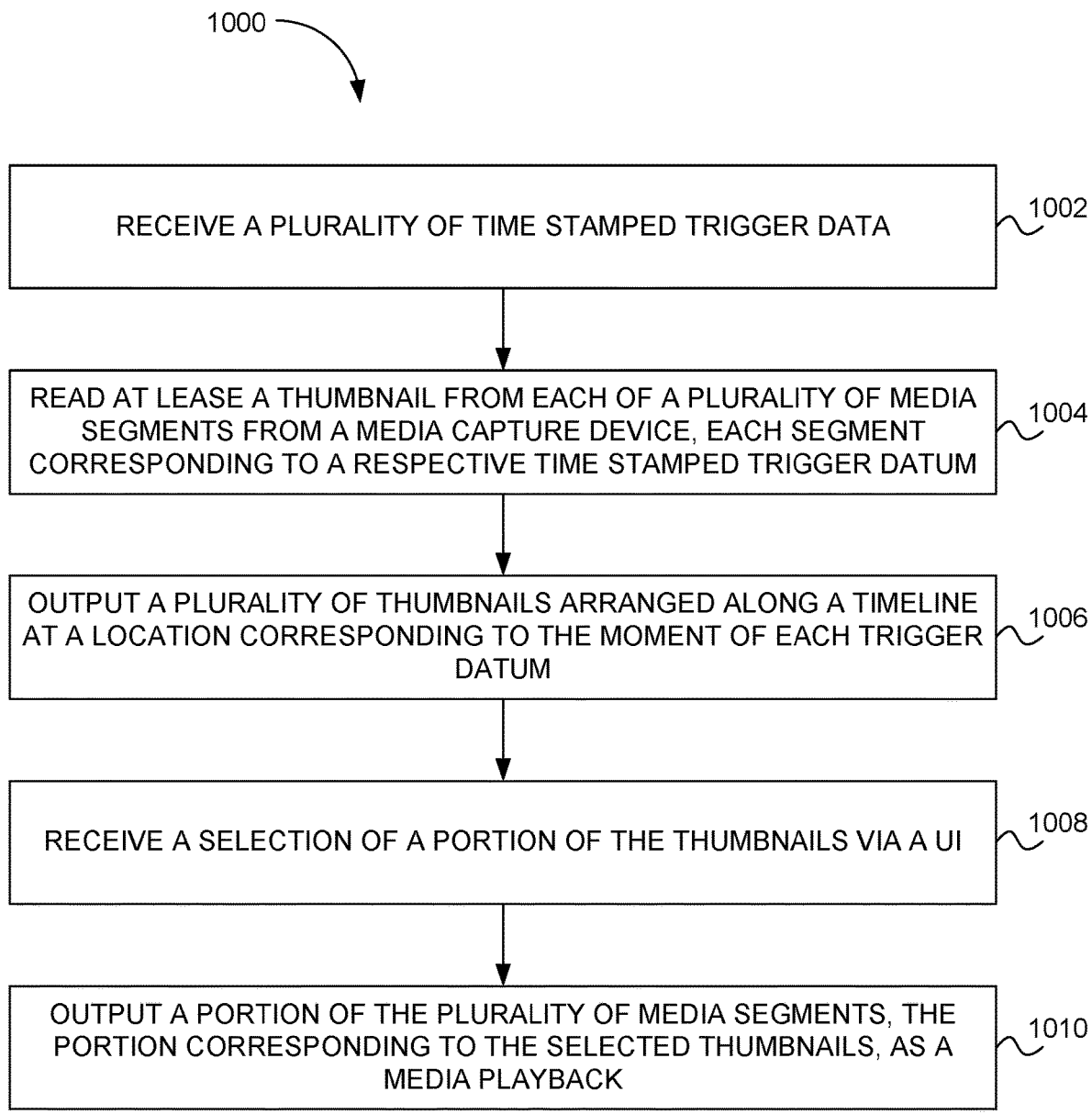
FIG. 10 is a flow diagram of a process for presenting a media playback, according to an embodiment.

FIG. 10 is a flow diagram of a process 1000, according to an embodiment. At 1002, a plurality of time stamped trigger data is received. At 1004, at least a thumbnail from each of a plurality of media segments from a media capture device is read. Each segment corresponds to a respective time stamped trigger datum. At 1006, a plurality of thumbnails or outputs are arranged along the timeline at a location corresponding to the moment of each trigger datum. At 1008, a selection of the portion of the thumbnails is received via a user interface. At 1010, a portion of the plurality of media segments is output as a media playback. The portion corresponds to the selected thumbnails.

Figure 11:
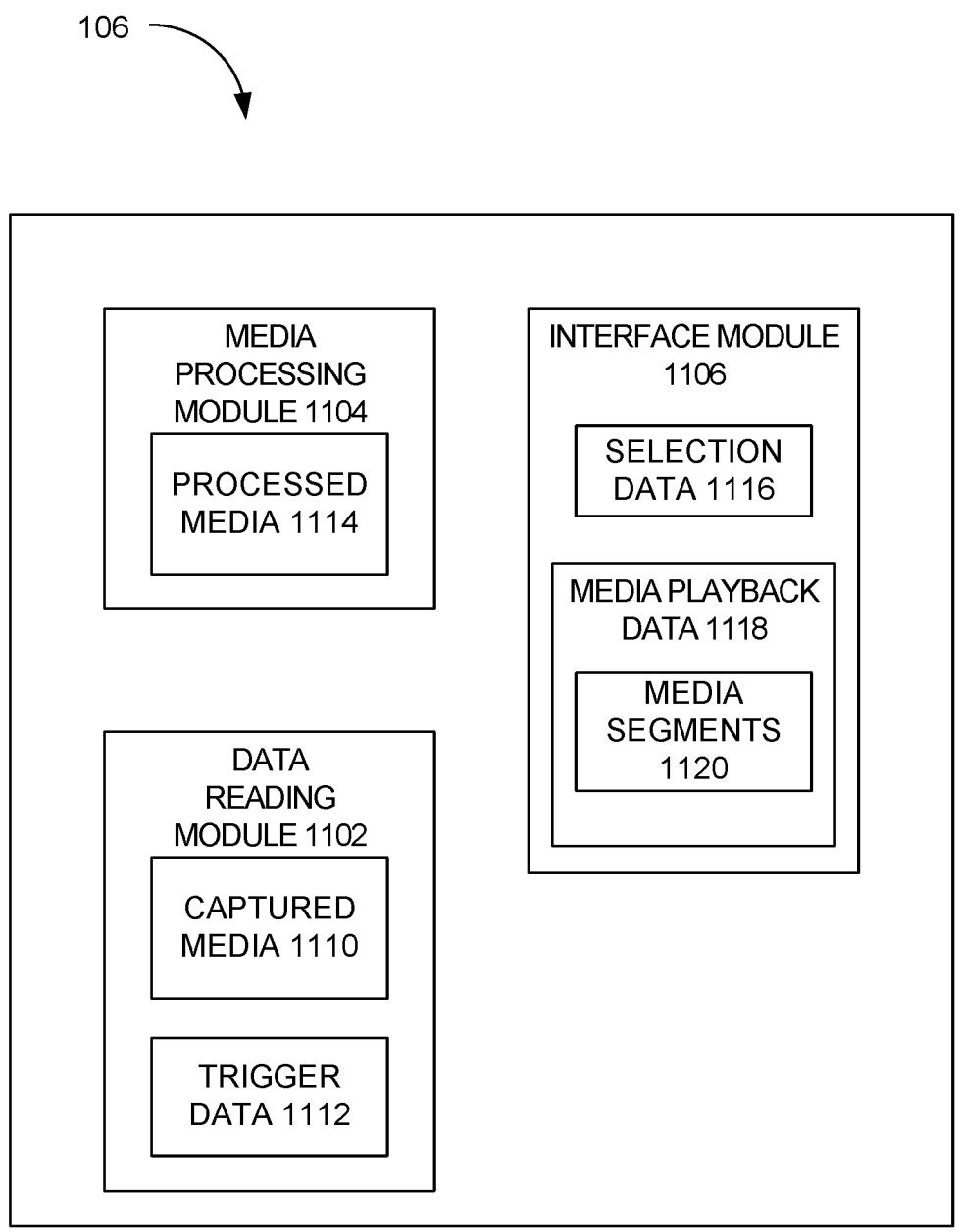
FIG. 11 is a block diagram of a media processing system, according to an embodiment.

FIG. 11 is a block diagram of a media processing system 106, according to an embodiment. The media processing system 106 includes a data reading module 1102, a media processing module 1104, and an interface module 1106, according to an embodiment. The data reading module 1102, the media processing module 1104, and the interface module 1106 cooperate together to generate and present a media playback for users. In one embodiment, the data reading module 1102 is configured to read or receive captured media 1110 from one or more media capture devices 102. In one embodiment, the data reading module 1102 is configured to interface with one or more media capture devices 102 in order to read or receive the captured media 1110 from the media capture devices 102.

In one embodiment, the data reading module 1102 is configured to communicate with the media capture devices 102 via a network connection. For example, the data reading module 1102 may be configured to communicate with, and retrieve captured media 1110 from, the media capture devices 102 any time the media capture devices 102 have an Internet connection. Additionally, or alternatively, the media capture devices 102 may be configured to communicate with the data reading module 1102 when the media capture device 102 is connected to the media processing system 106 via a network other than the Internet. Additionally, or alternatively, the media capture devices 102 may be configured to communicate with the media processing system 106 when the media capture devices 102 are connected to the media processing system 106 with a wired connection.

The data reading module 1102 may query the media capture devices 102 in order to determine whether the media capture devices 102 have any captured media 1110 to upload to the media processing system 106. If the media capture devices 102 have captured media 1110 available for upload, the data reading module 1102 reads the captured media 1110 from the one or more media capture devices 102. In one embodiment, the media capture devices 102 may include software applications that are part of or are related to the media processing system 106. The media capture devices 102 may execute the software applications to cause communication with the media processing system 106 via a network connection.

In one embodiment, the data reading module 1102 is configured to read the captured media 1110 from one or more media capture devices 102 when a user of the media capture device 102 specifically elects to upload the captured media 1110. For example, the media capture device 102 may include a software application associated with the media processing system 106. When the media capture device 102 executes the software application, the user may select to upload the captured media 1110 to the media processing system 106 via a user interface of the media capture device 102.

In one embodiment, the data reading module 1102 is configured to read trigger data 1112. The trigger data 1112 may be read from a trigger device 104. Additionally, or alternatively, the trigger data 1112 may be read from the media capture device 102 that received the trigger data 1112 from the trigger device 104. The trigger data 1112 may include time stamps indicating each time that the user manipulated the trigger device 104 to generate a trigger signal. The time stamps indicate times at which trigger events occurred while the media capture device 102 was capturing media, or while the media capture device 102 was in a retrospective capture mode.

In one embodiment, the data reading module 1102 is configured to read or receive the trigger data 1112 from the trigger device 104. In one embodiment, the data reading module 1102 is configured to interface with one or more media capture devices 102 in order to read or receive the captured media 1110 from the media capture devices 102.

In one embodiment, the data reading module 1102 is configured to communicate with the trigger device 104 via a network connection. For example, the data reading module 1102 may be configured to communicate with, and retrieve the trigger data 1112 from, the trigger device 104 anytime the trigger device 104 has an Internet connection. Additionally, or alternatively, the trigger device 104 may be configured to communicate with the data reading module 1102 when the trigger device 104 is connected to the media processing system 106 via a network other than the Internet. Additionally, or alternatively, the trigger device 104 may be configured to communicate with the media processing system 106 when the trigger device 104 is connected to the media processing system 106 with a wired connection.

In one embodiment, the media processing module 1104 generates processed media 1114 from the captured media 1110. The media processing module 1104 may process the captured media 1110 in accordance with the trigger data 1112. The media processing module 1104 may generate media segments 1120 from the captured media 1110 based on the trigger data 1112.

In one embodiment, the media processing module 1104 generates the processed media 1114 from the captured media 1110 that corresponds to a media file that represents the entirety of captured media 1110 from the media capture device 102. For example, if the user of a media capture device 102 captured media for three hours, then in one embodiment the media processing module 1104 processes the three hours of captured media 1110 to generate multiple media segments 1120 based on the trigger data 1112. If the trigger data 1112 represents multiple trigger events, i.e., includes multiple time stamps, then the media processing module 1104 generates from the captured media 1110 a respective media segment 1120 for each time stamp in the trigger data 1112. The processed media data 1114 includes the multiple media segments 1120.

In one embodiment, the captured media 1110 received by the data reading module 1102 includes multiple media segments 1120. In this case, the media processing module 1104 may generate the processed media 1114 by processing the previously generated media segments 1120 into a format that may be accessed by the user.

In one embodiment, the media processing module 1104 receives the captured media 1110 from multiple media capture devices 102. The media processing module 1104 processes the captured media 1110 from the multiple media capture devices 102 and generates the processed media 1114 including a plurality of media segments 1120 for each time stamp in the trigger data 1112. For each time stamp, the media processing module 1104 generates multiple media segments 1120, each from a different media capture device 102. Each media segment 1120 covers a same real time span. If the captured media 1110 includes media from three media capture devices 102, and if the trigger data 1112 includes two trigger events, then the media processing module 1104 generates the processed media 1114 that includes three media segments 1120 associated with the first trigger event, and three media segments 1120 associated with the second trigger event.

In one embodiment, the processed media data 1114 includes a plurality of thumbnails representing various media segments 1120 generated by the media processing module 1104 or received from the media capture devices 102. In one embodiment, the processed media 1114 includes a large media playback data file 1118 in a format that includes user accessible markers that indicate locations within the large media playback data file 1118 corresponding to the trigger events.

In one embodiment, the interface module 1106 is configured to enable the user to interface with the media processing system 106. The user may interface with the media processing system 106 via a personal electronic device 108 of the user. The personal electronic device 108 may include a software application linked to the media processing system 106. Additionally, or alternatively, the personal electronic device 108 includes the media processing system 106 as software instructions executed by the personal electronic device 108. Additionally, or alternatively, a portion of the media processing system 106 may be implemented on the personal electronic device 108, and a portion of the media processing system 106 may be implemented within one or more remote servers, or on a separate computing device. However the user accesses the media processing system 106, the interface module 1106 enables the user to interface with the media processing system 106.

In one embodiment, the interface module 1106 presents the media playback data 1118 to the user. The interface module 1106 may present the media playback data 1118 to the user on a display of the personal electronic device 108. Alternatively, the interface module 1106 may present the media playback data 1118 to the user in a different manner.

In one embodiment, the media playback data 1118 includes a media playback of the processed media 1114 generated from the captured media 1110. Accordingly, the media playback data 1118 may include a plurality of media segments 1120 from the processed media 1114. The media playback data 1118 may also include unsegmented media files received from the media capture devices 102. The media playback data 1118 may include thumbnails representing a plurality of media segments 1120 that the user can select to view. The media playback data 1118 may include large media files presented with a timeline that includes markers that indicate the locations of the media segments 1120 that correspond to the trigger events. The markers may include thumbnail images showing a frame of captured media 1110 representing the media segment 1120.

In one embodiment, the interface module 1106 receives selection data 1116 from the user. For example, the media playback data 1118 may include a plurality of media segment files and full media files. The user may provide the selection data 1116 indicating which of the media segment files should be compiled for a highlight compilation. The selection data 1116 may indicate which segments, compilations, or full media files should be kept and which should be deleted. The selection data 1116 may indicate which media files should be downloaded from the media processing system 106 to the personal electronic device 108. The selection data 1116 may indicate which media files that should be permanently saved in a backup storage, or a cloud-based storage. The selection data 1116 may indicate a media file that should be played as part of the media playback data 1118 immediately. The media processing module 1104 may generate further processed media 1114 based on the selection data 1116.

According to an embodiment, the media processing system 106 includes a plurality of media capture devices 102 at least intermittently operatively coupled to a communication network, a plurality of trigger devices 104 at least intermittently operatively coupled to the communication network, and a server computer operatively coupled to the communication network, the server computer being configured to run one or more software programs. In one embodiment, the one or more software programs may include the data reading module 1102 configured to read the captured media 1110 and the trigger data 1112 respectively from the plurality of media capture devices 102 and the plurality of trigger devices 104, the trigger data 1112 including a plurality of time stamps, each indicating a real time associated with a trigger event. In another embodiment, the one or more software programs may include a media processing module 1104 configured to generate, from the captured media 1110 and the trigger data 1112, a plurality of media segments, each media segment corresponding to a trigger datum from at least one of the plurality of media capture devices 102. Additionally and/or alternatively, the media processing system 106 includes, in the software program run by the server computer or in a local software program run on one or more of the media capture devices 102, an interface module 1106 configured to present a media playback including the media segments to a user, according to an embodiment. The media playback may include, for each trigger datum, plural media segments each received from a respective one of the plurality of media capture devices 102. The data reading module 1102, the media processing module 1104, and the interface module 1106 cooperate together to generate and present the media playback for users.

In one embodiment, at least a portion of the plurality of trigger devices 104 also include a media capture device 102.

In one embodiment, the data reading module 1102 is configured to detect when one of the plurality of media capture devices 102 is connected to the communication network and to read the captured media 1110 from the media capture device 102 upon detecting that the media capture device 102 is connected to the communication network.

In one embodiment, the data reading module 1102 is configured to detect when the trigger device 104 is connected to the communication network and to read the trigger data 1112 from the media capture device 102 upon detecting that the media capture device 102 is connected to the communication network.

According to an embodiment, the plurality of trigger data 1112 includes, for each stamp, a location datum corresponding to a location of the trigger device 104 that generates the trigger data 1112 at a time that the trigger device 104 generated the time stamp. In an embodiment, the data reading module 1102 is configured to discover and identify at least a portion of proximate media capture devices 102 having a media capture zone proximate to the trigger device 104 when the time stamp was generated by the user interface and to read at least one media segment from each of the proximate media capture devices 102.

According to an embodiment, at least a portion of the media capture devices 102 is configured to operate in a retrospective capture mode by temporarily capturing media to a temporary storage, by continuously replacing the oldest temporarily captured media 1110 with new temporarily captured media 1110 when the temporary storage is full, and by transferring the temporarily captured media 1110 from the temporary storage to a permanent storage as the captured media 1110 in response to receiving trigger data 1112 from the trigger device 104 being queried by the data reading module 1102.

According to an embodiment, the data reading module 1102 is operable to query the plurality of media capture devices 102 to receive media data captured at a moment in time different than but near a moment in time corresponding to a trigger datum. In this way, the media processing system 106 may allow for capturing of contemporaneously captured media 1110 that is not necessarily synchronized to the trigger device 104.

Figure 12:
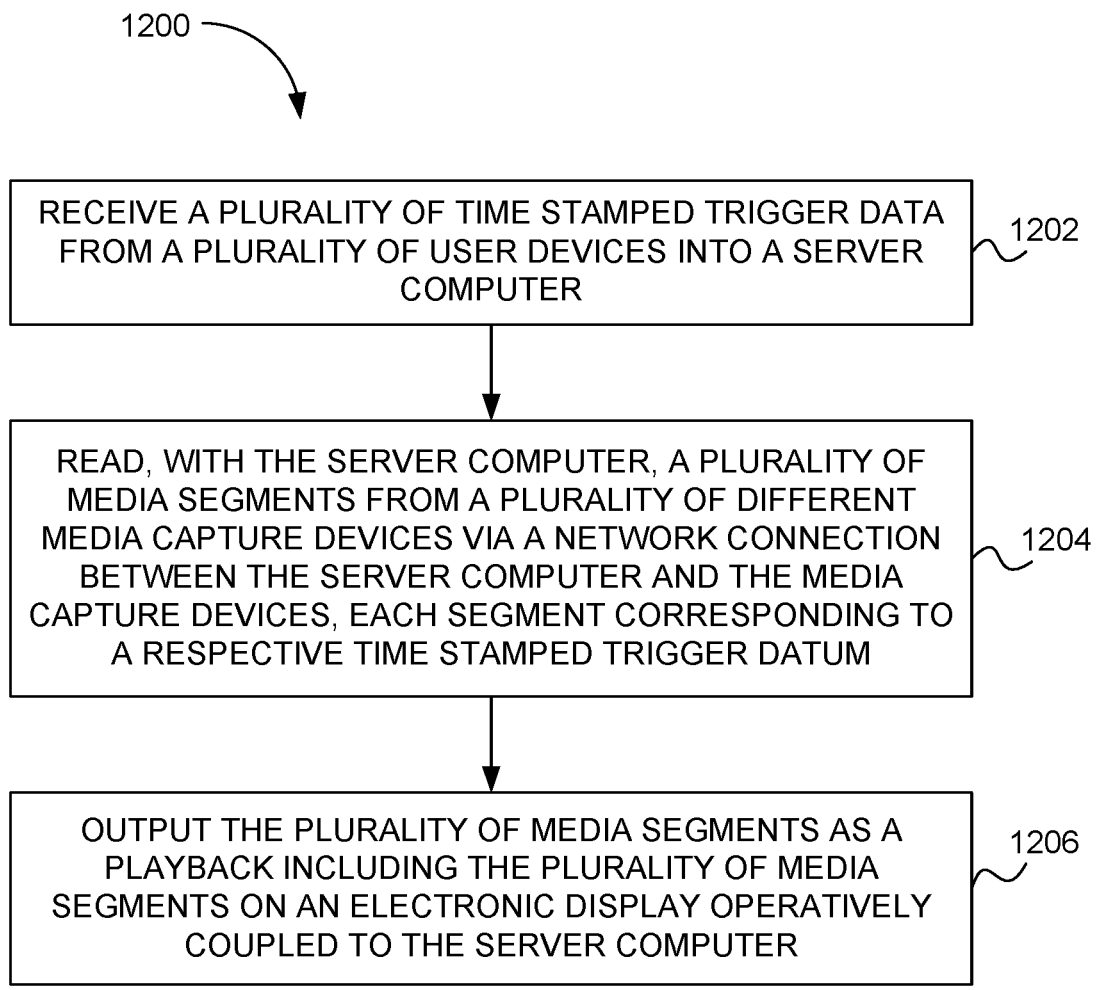
FIG. 12 is a flow diagram of a computer method for presenting a media playback, according to an embodiment.

FIG. 12 is a flow diagram of a computer method 1200 for presenting a media playback, according to an embodiment. The computer method includes, in step 1202, receiving a plurality of time stamped trigger data from a plurality of user devices into a server computer. Step 1204 includes reading, with the server computer, a plurality of media segments from a plurality of different media capture devices via a network connection between the server computer and the media capture devices, each media segment corresponding to a respective time stamped trigger datum. Step 1206 includes outputting the plurality of media segments as a playback including the plurality of media segments on an electronic display operatively coupled to the server computer. In an embodiment, in step 1204, reading the plurality of media segments from the plurality of different media capture devices includes reading a time datum corresponding media segment from each of a plurality of cross-registered devices without reference to whether a particular one of the cross-registered devices received a trigger. Cross-registration may include enrollment in a group defined on a communication network. In an embodiment, the communication network may include a social network. For example, such a method may be considered for recording of substantially simultaneous moments across plural devices. Accordingly, a group of friends may, for example, simultaneously record and edit recordings of events from each of several perspectives.

Additionally or alternatively, a cross-registration may be automatically and/or dynamically made by receiving a trigger from a user device, determining a location of the user device, performing local discovery of available media capture devices, optionally inferring or determining a relevance of particular discovered available media capture devices, and cross registering at least a portion of discovered available media capture devices.

According to an embodiment, each of the plurality of media segments includes a portion beginning prior to a time stamp of the respective time stamped trigger datum.

According to an embodiment, the computer method 1200 includes a trigger device outputting the time-stamped trigger datum to the plurality of media capture devices.

According to an embodiment, the plurality of time stamped trigger data each includes a location datum corresponding to a location of a trigger device that generates the trigger data in response to receiving a trigger state from a user interface. Additionally and/or alternatively, the plurality of time stamped trigger data each includes a location datum corresponding to a location of a trigger device that generates the trigger data in response to receiving a trigger state from a user interface, and further includes discovering at least a portion of the media capture devices which are proximate and which are identified in a media capture zone proximate to the trigger device when the trigger state was generated by the user interface. Reading the plurality of media segments, in step 1204, includes reading at least one media segment from each of the proximate media capture devices.

According to an embodiment, in step 1206, outputting the plurality of media segments as a playback including the plurality of media segments further includes assembling the plurality of media segments in a time sequence corresponding to the sequence of time stamps, and outputting the sequence of segments as a playback. In another embodiment, in step 1206, outputting the plurality of media segments as a playback further includes assembling at least a portion of the plurality of media segments as panes in a display list, and outputting the plurality of media segments includes simultaneously outputting a plurality of panes from the display list on the user interface.

According to an embodiment, the computer method 1200 includes linking the plurality of media capture devices together prior to using the media capture devices to capture the media.

According to an embodiment, in step 1204, reading a plurality of media segments from the media capture device includes reading captured media segments excluding times not corresponding to a trigger period. In one embodiment, the trigger period extends to a moment in time prior to the stamped time. In another embodiment, the trigger period extends to a moment in time after the stamped time.

According to an embodiment, the step of reading includes reading at least a thumbnail from each of the plurality of media segments, and further includes outputting a plurality of thumbnails arranged along a timeline at a location corresponding to a moment of each trigger datum and receiving a selection of a portion of the thumbnails via a user interface. In an embodiment, the step of outputting includes outputting a portion of the plurality of media segments, the portion corresponding to the selected thumbnails, as the playback.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A computer method for presenting a media playback, comprising:
   receiving a plurality of time stamped trigger data from a plurality of user devices into a server computer;
   reading, with the server computer, a plurality of media segments from a plurality of different media capture devices via a network connection between the server computer and the media capture devices, each media segment corresponding to a respective time stamped trigger datum; and
   outputting the plurality of media segments as a playback including the plurality of media segments on an electronic display operatively coupled to the server computer;
   wherein reading the plurality of media segments from the plurality of different media capture devices includes reading a time datum corresponding media segment from each of a plurality of cross-registered devices without reference to whether a particular one of the cross-registered devices received a trigger; and
   wherein cross-registration comprises enrollment in a group defined on a communication network.

2. The computer method of claim 1, wherein the communication network comprises a social network.

3. The computer method of claim 1, wherein each of the plurality of media segments includes a portion beginning prior to a time stamp of the respective time stamped trigger datum.

4. The computer method of claim 1, comprising a trigger device outputting the time stamped trigger datum to the plurality of media capture devices.

5. The computer method of claim 1, wherein the plurality of time stamped trigger data each includes a location datum corresponding to a location of a trigger device that generates the trigger data in response to receiving a trigger state from a user interface.

6. The computer method of claim 1,
   wherein the plurality of time stamped trigger data each includes a location datum corresponding to a location of a trigger device that generates the trigger data in response to receiving a trigger state from a user interface; and further comprising:
   discovering at least a portion of the media capture devices which are proximate and which are identified in a media capture zone proximate to the trigger device when the trigger state was generated by the user interface; and
   wherein reading the plurality of media segments includes reading at least one media segment from each of the proximate media capture devices.

7. The computer method of claim 1, wherein outputting the plurality of media segments as a playback comprising the plurality of media segments further comprises:
   assembling the plurality of media segments in a time sequence corresponding to a sequence of time stamps; and
   outputting the time sequence of segments as a playback;
   wherein outputting the plurality of media segments as a playback further comprises assembling at least a portion of the plurality of media segments as panes in a display list; and
   wherein outputting the plurality of media segments includes simultaneously outputting a plurality of panes from the display list on the user interface.

8. The computer method of claim 1, comprising:
   linking the plurality of media capture devices together prior to using the media capture devices to capture the media.

9. The computer method of claim 1, wherein reading a plurality of media segments from the media capture device includes reading captured media segments excluding times not corresponding to a trigger period.

10. The computer method of claim 9, wherein the trigger period extends to a moment in time prior to the stamped time.

11. The computer method of claim 9, wherein the trigger period extends to a moment in time after the stamped time.

12. The computer method of claim 1, wherein the step of reading includes reading at least a thumbnail from each of the plurality of media segments and further including:
   outputting a plurality of thumbnails arranged along a timeline at a location corresponding to a moment of each trigger datum; and
   receiving a selection of a portion of the thumbnails via a user interface;
   wherein the step of outputting includes outputting a portion of the plurality of media segments, the portion corresponding to the selected thumbnails, as the playback.

13. A media processing system, comprising:
   a plurality of media capture devices at least intermittently operatively coupled to a communication network;
   a plurality of trigger devices at least intermittently operatively coupled to the communication network;
   a server computer operatively coupled to the communication network, the server computer being configured to run one or more software programs, the one or more software programs including:
      a data reading module configured to read captured media and trigger data respectively from the plurality of media capture devices and the plurality of trigger devices, the trigger data including a plurality of time stamps, each indicating a real time associated with a trigger event; and
      a media processing module configured to generate, from the captured media and the trigger data, a plurality of media segments, each media segment corresponding to a trigger datum from at least one of the plurality of media capture devices; and
   in the software program run by the server computer or in a local software program run on one or more of the media capture devices, an interface module configured to present a media playback including the media segments to a user;

wherein the media playback includes, for each trigger datum, plural media segments each received from a respective one of the plurality of media capture devices.

14. The media processing system of claim 13, wherein at least a portion of the trigger devices also comprise a media capture device.

15. The media processing system of claim 13, wherein the data reading module is configured to detect when one of the plurality of media capture devices is connected to the communication network and to read the captured media from the media capture device upon detecting that the media capture device is connected to the communication network.

16. The media processing system of claim 15, wherein the data reading module is configured to detect when the trigger device is connected to the communication network and to read the trigger data from the media capture device upon detecting that the media capture device is connected to the communication network.

17. The media processing system of claim 13,
wherein the plurality of trigger data includes, for each time stamp, a location datum corresponding to a location of the trigger device that generates the trigger data at a time that the trigger device generated the time stamp; and wherein the data reading module is configured to:
discover and identify at least a portion of proximate media capture devices having a media capture zone proximate to the trigger device when the time stamp was generated by the user interface and to read at least one media segment from each of the proximate media capture devices.

18. The media processing system of claim 13, wherein at least a portion of the media capture devices are configured to operate in a retrospective capture mode by temporarily capturing media to a temporary storage, by continuously replacing the oldest temporarily captured media with new temporarily captured media when the temporary storage is full, and by transferring the temporarily captured media from the temporary storage to a permanent storage as the captured media in response to being queried by the data reading module.

19. The media processing system of claim 13, wherein the data reading module is operable to query the plurality of media capture devices to receive media data captured at a moment in time different than but near a moment in time corresponding to a trigger datum.

\* \* \* \* \*